United States Patent
Virk

(10) Patent No.: US 10,866,579 B2
(45) Date of Patent: Dec. 15, 2020

(54) AUTOMATED MANUFACTURING PROCESS TOOLING SETUP ASSIST SYSTEM

(71) Applicant: Toyota Motor Engineering & Manufacturing North America, Inc., Plano, TX (US)

(72) Inventor: Raman Virk, Mississauga (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 11 days.

(21) Appl. No.: 16/290,142

(22) Filed: Mar. 1, 2019

(65) Prior Publication Data
US 2020/0278660 A1    Sep. 3, 2020

(51) Int. Cl.
*G05B 99/00*    (2006.01)
*G05B 19/418*    (2006.01)

(52) U.S. Cl.
CPC ... *G05B 19/4183* (2013.01); *G05B 19/41865* (2013.01); *G05B 2219/31095* (2013.01); *G05B 2219/32197* (2013.01); *G05B 2219/33192* (2013.01); *G05B 2219/33203* (2013.01); *G05B 2219/49302* (2013.01)

(58) Field of Classification Search
CPC .......................................... G05B 2219/32127
USPC ....................................................... 700/116
See application file for complete search history.

(56) References Cited

U.S. PATENT DOCUMENTS

| | | | |
|---|---|---|---|
| 5,283,943 A * | 2/1994 | Aguayo | G05B 19/41805 29/701 |
| 7,069,100 B2 | 6/2006 | Monette et al. | |
| 8,417,364 B2 * | 4/2013 | Seaman | G05B 19/41805 700/95 |
| 2001/0003861 A1 * | 6/2001 | Mayr | B23P 21/004 29/407.04 |
| 2003/0102970 A1 | 6/2003 | Creel et al. | |
| 2003/0144809 A1 * | 7/2003 | Puchtler | G05B 19/404 702/105 |
| 2014/0330490 A1 * | 11/2014 | Aoki | E02F 9/265 701/50 |
| 2015/0248128 A1 * | 9/2015 | Davis | B23Q 3/15503 700/173 |
| 2015/0352719 A1 * | 12/2015 | Nakazato | G05B 19/4183 700/253 |

(Continued)

FOREIGN PATENT DOCUMENTS

JP    2008126367 A * 6/2008 ............... B25H 1/04

*Primary Examiner* — Suresh Suryawanshi
(74) *Attorney, Agent, or Firm* — Christopher G. Darrow; Darrow Mustafa PC

(57) ABSTRACT

An automated manufacturing process tooling setup assist system includes a controller configured to control movement and positioning of tools to provide a first tool spatial arrangement within a workspace. Responsive to an unsuccessful test process run using the tools in the first tool spatial arrangement, the controller may control movement of the tools so as to replace a tool in the first tool spatial arrangement with another tool configured to perform a function of the tool to be replaced. Responsive to a successful test process run using the tools in the first tool spatial arrangement, the controller may control movement of the tools so as to reposition one or more tools in the workspace to provide a second tool spatial arrangement within the workspace different from the first tool spatial arrangement.

19 Claims, 7 Drawing Sheets

(56) References Cited

U.S. PATENT DOCUMENTS

2018/0027218 A1* 1/2018 Kiso ................... H04N 9/3194
                                                        705/7.14
2018/0126558 A1* 5/2018 Ooba ................. G06K 9/00382

* cited by examiner

US 10,866,579 B2

AUTOMATED MANUFACTURING PROCESS TOOLING SETUP ASSIST SYSTEM

TECHNICAL FIELD

The subject matter described herein relates, in general, to manufacturing systems and, more particularly, to a system designed to aid in determining optimum spatial arrangements for tools used to run a process in a manufacturing environment

BACKGROUND

The success and/or efficiency of a manufacturing process may be dependent on the spatial arrangement of the tools used to perform the process. Much time and effort may be involved in gathering data relating to the performance of a process using a particular tool spatial arrangement, and in determining an optimum tool spatial arrangement for a given process. To help ensure a successful performance of a process, it may also be helpful to have data (including information regarding tool spatial arrangements and process data) relating to both successful and unsuccessful process runs.

SUMMARY

In one aspect of the embodiments described herein, an automated manufacturing process tooling setup assist system is provided. The system includes one or more processors and a memory communicably coupled to the one or more processors and storing a tooling spatial arrangement control module. The tooling spatial arrangement control module includes instructions that when executed by the one or more processors cause the one or more processors to control operation of one or more tooling transport devices and/or one or more tooling positioning devices so as to position one or more tools to provide a first tool spatial arrangement within a workspace. Responsive to a first result of an evaluation of a process run using the tools in the first tool spatial arrangement, the processor(s) may execute instructions in the tooling spatial arrangement control module to control operation of the one or more tooling transport devices and/or the one or more tooling positioning devices so as to replace a tool in the first tool spatial arrangement with another tool configured to perform a function of the tool to be replaced. Responsive to a second result different from the first result of the evaluation of the process run using the tools in the first tool spatial arrangement, the processor(s) may execute instructions in the tooling spatial arrangement control module to control operation of the one or more tooling transport devices and/or the one or more tooling positioning devices so as to reposition one or more tools in the workspace to provide a second tool spatial arrangement within the workspace different from the first tool spatial arrangement.

In another aspect of the embodiments described herein, a method of determining a spatial arrangement for tools in a workspace for performance of a manufacturing process is provided. The method includes a step of controlling operation of one or more tooling transport devices and/or one or more tooling positioning devices so as to position one or more tools to provide a first tool spatial arrangement within a workspace. The method also includes a step of, responsive to a first result of an evaluation of a process run using the tools in the first tool spatial arrangement, the processor(s) may execute instructions in the tooling spatial arrangement control module to control operation of the one or more tooling transport devices and/or the one or more tooling positioning devices so as to replace a tool in the first tool spatial arrangement with another tool configured to perform a function of the tool to be replaced. The method also includes a step of, responsive to a second result different from the first result of the evaluation of the process run using the tools in the first tool spatial arrangement, the processor(s) may execute instructions in the tooling spatial arrangement control module to control operation of the one or more tooling transport devices and/or the one or more tooling positioning devices so as to reposition one or more tools in the workspace to provide a second tool spatial arrangement within the workspace different from the first tool spatial arrangement.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments of an automated manufacturing process tooling setup assist system are disclosed herein. The tooling setup assist system may operate in a manufacturing environment to aid in gathering data usable for determining an optimum spatial arrangement for tools in performing a new process. A system controller may receive a request for tools needed to perform a manufacturing operation. The controller may identify tools which are needed or suitable for performing the manufacturing process. The controller may autonomously determine the availability of the tools needed or suitable for performing the manufacturing process. The controller may autonomously control operation of tooling transport devices to acquire tools which are available and which are needed or suitable for performing the manufacturing process. The controller may autonomously control operation of the tooling transport devices to transport the acquired tools to a predetermined workspace. The controller may autonomously control operation of tooling transport devices and/or tooling positioning devices in the workspace, to position the tools in an initial tool spatial arrangement. After a test process is run, and based on an evaluation of the process run, the controller may autonomously control operation of tooling transport devices and/or tooling positioning devices to replace one or more tools in the workspace and/or reposition one or more tools in the workspace, after which another test process run may be performed. Data gathered during the test process runs using tools positioned in different spatial arrangements may be analyzed to aid in determining an optimum spatial arrangement of the tools for the process. In another aspect, the tooling setup assist system may also be used to automatically spatially position tools in a spatial arrangement for performance of an established or known process, where the optimum tool positions have previously been determined and are known.

Figure 1:
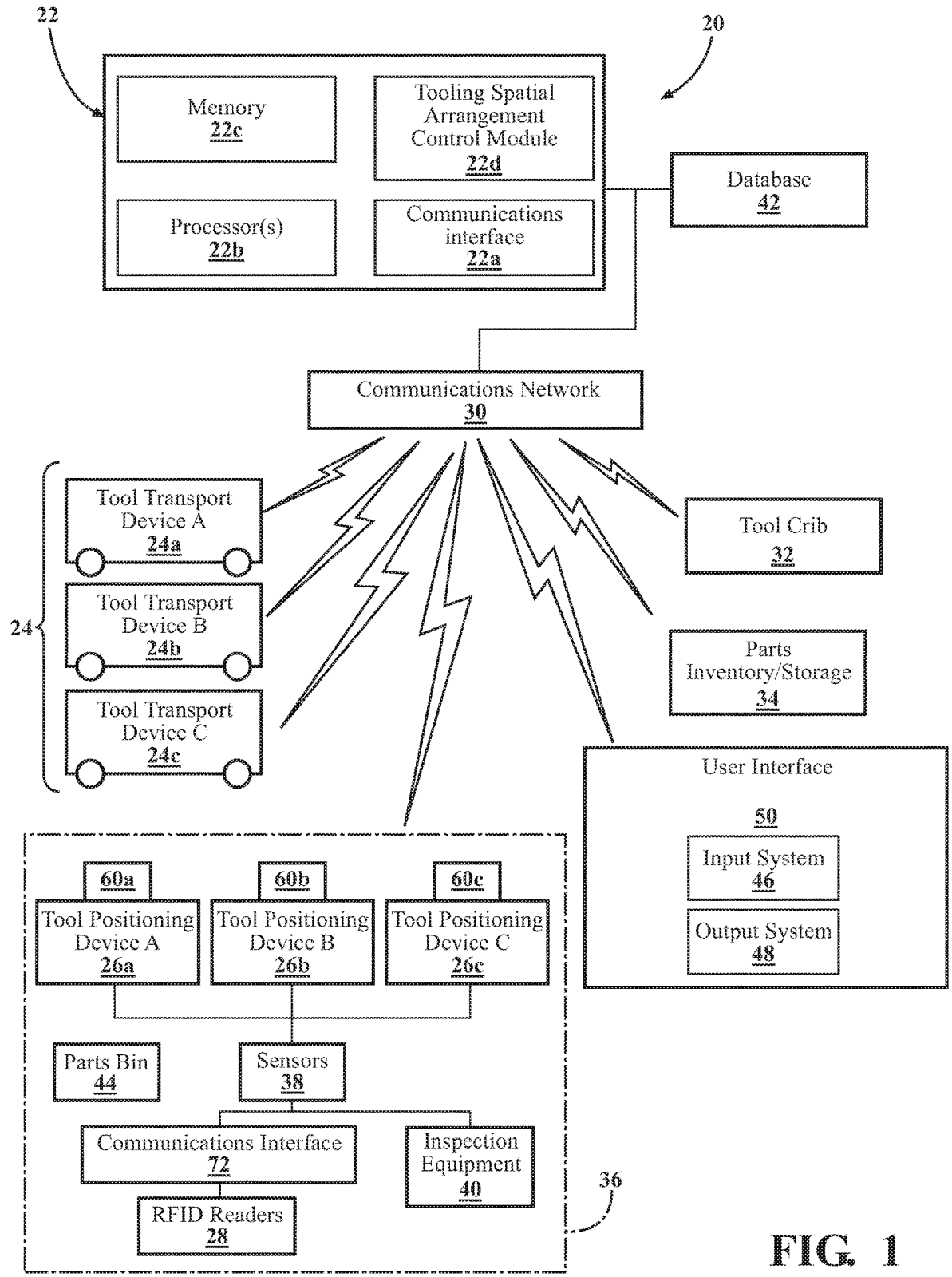
FIG. 1 is a block schematic view of a portion of a manufacturing facility incorporating an automated manufacturing process tooling setup assist system (generally designated 20) in accordance with an embodiment described herein.

FIG. 1 is a block schematic view of a portion of a manufacturing facility incorporating an automated manufacturing process tooling setup assist system (generally designated 20) in accordance with an embodiment described herein. The system 20 may be configured to aid a user in establishing and optimizing a tooling setup for a manufacturing process in a workspace in a manufacturing facility. In one or more arrangements, the tooling setup assist system 20 may include a controller 22, one or more tool transport devices (collectively designated 24) configured to be controllable by the controller 22, one or more tool positioning devices 26 configured to be controllable by the controller 2, and a plurality of RFID tag readers (generally designated 28) configured to read RFID tags attached to tools and/or parts bins used in the manufacturing process. The term "manufacturing process" as used herein encompasses all operations relating to fabrication or processing of components, sub-assemblies, and final assemblies. During performance of a manufacturing process on a part, the part is modified or changed in some way. For example, a dimension of a component may be changed, or one or more additional elements may be added to a part to modify an existing assembly or sub-assembly, or to form a new assembly or sub-assembly.

The terms "tooling" and "tool" as used herein describe all tooling, jigs, and fixtures used by an operator to hold a component, sub-assembly, or assembly, and/or to perform (or aid in performing) a manufacturing process on a component, sub-assembly, or assembly. The term "parts" refers collectively to any components, sub-assemblies or other elements which are to be operated on by performance of the manufacturing process, using the tools. The terms "bin" and "parts bin" refer to any bins, racks and/or other receptacles containing the parts which are to be operated on by performance of the manufacturing process. A "process run" is the performance of a manufacturing process using one or more tools in a workspace, on a predetermined number of parts. For purposes described herein, a workspace may be defined as a volume of space in which a manufacturing process is to be performed, and in which the tools, parts bins, and other elements necessary for performance of the process may be positioned.

The controller 22 may include a communications interface 22a configured to enable wired and/or wireless communication (via a suitably configured communications network 30) with other elements of the system 20, for example, tool transport devices 24, a tool crib 32, a parts inventory and storage area 34, RFID tags attached to tools 60, tool positioning devices 26, and various elements located in the workspace 36 (such as workspace sensors 38, RFID tag readers 28, inspection equipment 40, etc.). The controller 22 may be configured to receive and process any information acquired by the RFID tag readers 28.

The controller 22 may be configured to receive a tooling request and to control other elements of the process tooling setup assist system to effect identification of tools satisfying the tooling request, acquisition and transport of the tools to a workspace, initial positioning of the tools in a workspace, and repositioning of the tools in the workspace. The controller may also perform other functions as described herein.

The controller 22 can include one or more processors 22b. A memory 22c may be communicably coupled to the one or more processors 22b. The memory 22c may be a random-access memory (RAM), read-only memory (ROM), a hard-disk drive, a flash memory, or other suitable memory for storing one or more modules, including a tooling spatial arrangement control module 22d as described herein. The controller 22 may be configured to perform the various operations described herein by execution by processor(s) 22b of one or more instructions stored in the tooling spatial arrangement control module 22d.

In one or more arrangements, the controller 22 can be a central host computer which is used for enterprise data management or dedicated to a specific function such as statistical process control. In one or more arrangements, the system 20 may incorporate multiple controllers, with a combination of stand-alone and centralized software controls. These controllers can be, if required, linked together or to any other computer or controlling unit, in order to access databases, share data or simply transmit commands or status information.

The automated manufacturing process tooling setup assist system 20 may include a database 42 in operable communication with controller 22. The database 42 is, in one embodiment, an electronic data structure and that is configured with routines that can be executed by the processor(s) 22b for analyzing stored data, providing stored data, organizing stored data, and so on. The database 42 may be stored in memory 22c or the database 42 may be separate from the memory 22c. Thus, in one embodiment, the database 42 stores data used by the tooling spatial arrangement control module 22d in executing the various functions described herein.

Non-exclusive types of information which may be stored in database 42 may include:

process information (i.e., sensor data, process run times, details regarding the tool spatial arrangements of tools during process runs, etc.) for each run of a manufacturing process;

a description of the process being performed on a tool and/or a set of tools. The process description may be, for example, in the form of a alphanumeric code which describes the details of the process steps to be performed, set-up procedures for the tools, etc.;

one or more criteria for distinguishing between a "good" process run and a process run that is "not good";

environmental data detectible by sensors, including ambient temperature, humidity, lighting levels in the workspace, and other parameters;

% scrap produced in a given process run, for multiple process runs;

detailed finished part measurements/dimensions (as determined by inspection equipment, especially automated inspection equipment) resulting from each process run; and ergonomic data relating to various operators (such as name, experience level with the process in question, ergonomic data (such as left or right-handed preference, height, reach, etc.)).

In one or more arrangements, the tools, parts bins, and tooling transport devices 24 contemplated herein may be configured so as to enable a tooling transport device 24 to transport parts bins as well as tools. FIG. 1 shows three tooling transport devices 24a, 24b, 24c; however any number of such devices may be used. Any tooling transport device 24 may be configured to position a parts bin 44 on a floor of the workspace 36 adjacent a tool or tooling positioning device 26, and/or the tooling transport device 24 may be configured to position a parts bin 44 on a tooling positioning device 26 adjacent the tool. The tooling transport device 24 may also be configured to move a tool/bin within a workspace 36 and/or to move a tooling positioning 26 device within the workspace 36, to aid in repositioning a tool/bin within the workspace.

In one or more arrangements, tooling transport devices 24 may be mobile, self-propelled robotic material handling devices configurable to be wirelessly controllable by controller 22. The tooling transport devices 24 may be configurable to move themselves to, from, and between any portions of the manufacturing facility needed to acquire, transport, and deposit tools, parts bins, and other elements needed for performance of a manufacturing process in a workspace and/or to place or position a tool on a tooling positioning device 26 in the workspace 36. The tooling transport devices 24 may incorporate end effectors, grippers, or other movable features for gripping, lifting and/or securing an item to be transported, and may include one or more surfaces on which an item may rest during transport. Tooling transport devices capable of performing the functions described herein may be commercially available from a variety of sources, for example, Fetch Robotics of San Jose, Calif., and Mobile Industrial Robots of Odense, Denmark.

The automated manufacturing process tooling setup assist system 20 may include a user interface 50 (such as a laptop computer, remote terminal, or cellular device) configured to enable operable communication between a user and the system 20. The user interface may include an input system 46. An "input system" includes any device, component, system, element or arrangement or groups thereof that enable information/data to be communicated to the controller or to any other element of the system 20 communicably coupled to the input system. The input system 46 can receive an input from a user of the system 20. The user interface may also include an input system 48. An "output system" includes any device, component, or arrangement or groups thereof that enable information/data to be presented to user.

Tool crib 32 or another tool storage and maintenance area may house tools usable for manufacturing processes, when the tools are not in use or are undergoing maintenance. The tooling transport devices 24 may be configured to autonomously move to the tool crib 32 and access any tools selected for the manufacturing process. The tooling transport devices 24 may be configured to transport such tools to a designated workspace 36 for positioning and setup.

Parts to be processed in manufacturing operations may be stored in a parts inventory or storage area 34 and may be accessed and transported to the workspace 36 for processing using any of a variety of known, suitable methods.

Figure 2:
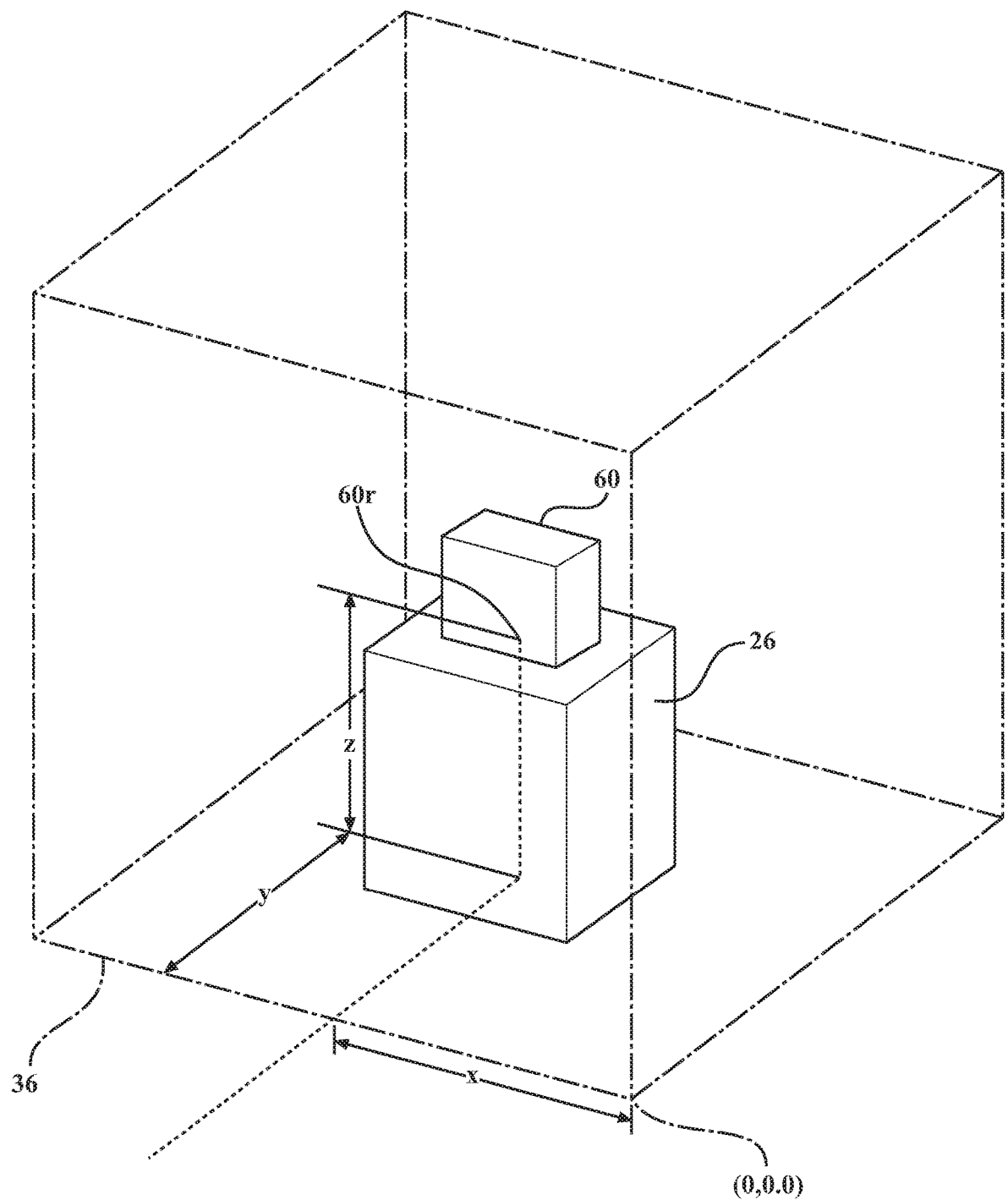
FIG. 2 is a block schematic perspective view of workspace 36 showing one example of a coordinate system usable for location a reference feature of a tool positioned in the workspace 36.

FIG. 1 shows one example of a workspace 36 incorporating an embodiment of the automated manufacturing process tooling setup assist system 20. FIG. 2 is a block schematic perspective view of workspace 36 showing one example of a coordinate system usable for location a reference feature of a tool 60 positioned in the workspace 36. Although a three-dimensional rectangular spatial coordinate system is shown in FIG. 2, another type of coordinate system or locating system may also be used for assigning the reference feature a location within the workspace 36.

In FIG. 2, the reference feature location 60r for tool 60 shown has workspace coordinates (x, y, z) with respect to a workspace reference location (0, 0, 0). A reference feature on any tool positioned in the workspace 36 may be located within the workspace in a similar manner. Controller 22 may be configured to determine the relative spatial relationships between multiple tools in the workspace 36, given known tools spaces and dimensions of the tools, and the measured or calculated locations of respective reference features within a tool space. The reference feature locations may be determined using RFID tag readings of the distances of the tags from the readers, the known positions of the tags with respect to the tool reference features, and the known positions of the tag readers within the workspace. Readings from multiple tag readers may be processed and the locations of the reference features determined by triangulation, for example.

The "tool space" of a tool may be a largest volume of space occupied by the tool during operation of the tool to perform a manufacturing process. The "operator space" of a tool may be an estimated maximum volume of space adjacent a tool space of the tool needed by an operator to perform a manufacturing operation using the tool. The "tool envelope" for a tool may be the tool space combined with the operator space. The tool space and operator space for a given tool may be determined by analysis or experimentation and stored in database 42 for each tool. For example, FIGS. 4A-4D and 5 show a tool envelope 61 for tool 60a, a tool envelope 63 for tool 60b, and a tool envelope 65 for tool 60c. Tool envelope 61 has a tool space 61a and an operator space 61b. Tool envelope 63 has a tool space 63a and an operator space 63b. Tool envelope 65 has a tool space 65a and an operator space 65b.

Referring to FIG. 1, an associated tool 60 is shown positioned on each of the tool positioning devices 26a, 26b, 26c. Each of tools 60a, 60b, 60c and parts bin 44 may have attached thereto at least one radio frequency identification (RFID) transponder or tag (not shown) containing information relating to the tool or part bin. In one or more arrangements, the RFID tags may be known high-capacity RFID tags having a memory and configured to allow information to be written and rewritten into the tag memory, for example, thousands or hundreds of thousands of times. The number of RFID tags mounted on a tool may depend on such factors as the memory capacity of the tag, the type and amount of information to be stored on the tag, and other pertinent factors. A typical industrial RFID system may include at least one readable tag, and a tag read head or reader. The reader may be a read device or a write/read device capable of writing and rewriting information onto the tag. As used herein, the term "reader" refers to devices capable of both reading information stored on the tag, and devices capable of reading and writing to the tag.

Examples of information which may be stored on an RFID tag attached to a tool 60 and/or in database 42 include:

a tool identifier (or parts bin identifier, for a parts bin);

the total number of process cycles that have been performed on the tool;

the number process cycles that have been performed on the tool since the last time maintenance was performed on the tool;

the total number successful (i.e., "good") process cycles that have been performed on the tool;

the total number unsuccessful (i.e., "not good") process cycles that have been performed on the tool;

a history of when the successful process cycles and unsuccessful process cycles occurred;

the date of the last time maintenance was performed on the tool;

an identity of the worker(s) who last performed maintenance on the tool;

an alert or threshold (for example, a total number of "not good" cycles) describing conditions under which the tool is to be removed the tool from the workspace or operation;

set-up information for the tool (i.e., steps to prepare the tool for the manufacturing operation after the tool has been positioned);

the size (volume) of the tool envelope;

the size (volume) of the tool space;

the location of a reference feature relative to location of the RFID tag on the tool (if the tag location is not the reference feature location). This enables the location of the reference feature to be determined using the position of the RFID tag as detected by a reader, thereby enabling controlled positional adjustments of the tool/bin positions to be made by the controller, operating through control of the tooling positioning devices and the tooling transport devices;

one or more codes associated with and describing all of the manufacturing processes the tool is used in;

for each production process/operation the tool is used in, all other individual tools, etc. which are used with the tool in the production process; and for each production process/operation the tool is currently used in, the current spatial relationship of the tool to the other tools used for the production process. These spatial relationships between tools may be fixed and stored on the tool RFID tag for production processes which have been established or finalized. A "production process" may be a process for which optimum process parameters and tooling spatial arrangements have been established and recorded. These parameters and spatial arrangements will then be reproduced and used whenever the particular production process is run, until the parameters and/or spatial arrangement is changed for some reason.

For new processes being set up, the tooling spatial relationships may vary with different trial process runs as the tools and/or parts bins are repositioned during process setup as described herein. Thus, for new process set-up, the spatial relationships for each trial run may be stored in database 42 and used as references for successive positional adjustments of the tools and/or parts bins during set-up. This procedure may also be followed for modifications to production processes.

The tag readers 28, depending upon design and the technology used, may be read or write/read devices. A reader may contain a radio frequency module (transmitter and receiver), a control unit and a coupling element to the RFID tag transponder. In addition, many readers are fitted with an additional interface (parallel or serial communication) to enable them to forward the data received to another system (PC, robot control system, etc.). The coupling element (antenna) may be optimized for each application in accordance with the basic requirements of the specific RFID technology (frequency), mechanical constraints and electromagnetic and interference limitations, in order to provide an adequate read range in combination with the transponder 12. In some applications, many transponders can be at the same time in the range of a single reader and the system must be designed with the appropriate "anti-collision" software and hardware.

Each tag reader 28 may be configured to detect the distance of a detected tag from the reader. The controller 22 may be configured to receive spatial position data acquired by the tag readers 28 and to process this data to determine spatial positions of (and spatial relationships between) the tags detected by the readers. Using these detected distances and the known locations of the readers 28 within the workspace and manufacturing facility, spatial coordinates and/or relative positions of the tags (and the associated reference features of the tools 60) may be determined in a known manner, for example, by triangulation.

The RFID tag readers 28 may be configured for fully automatic read/write operations, for which no human intervention is required. Thus, the readers 28 may constantly (i.e., as soon information is acquired or detected) or at regular time intervals acquire the positions of the tagged tools and parts bin, and may relay this information to the controller. This mode of operation may also permit information to be written to the tags constantly or at regular time intervals. A read/write cycle may be continuous or it can be triggered by appropriate sensors and software or other automatic control systems.

Figure 3A:
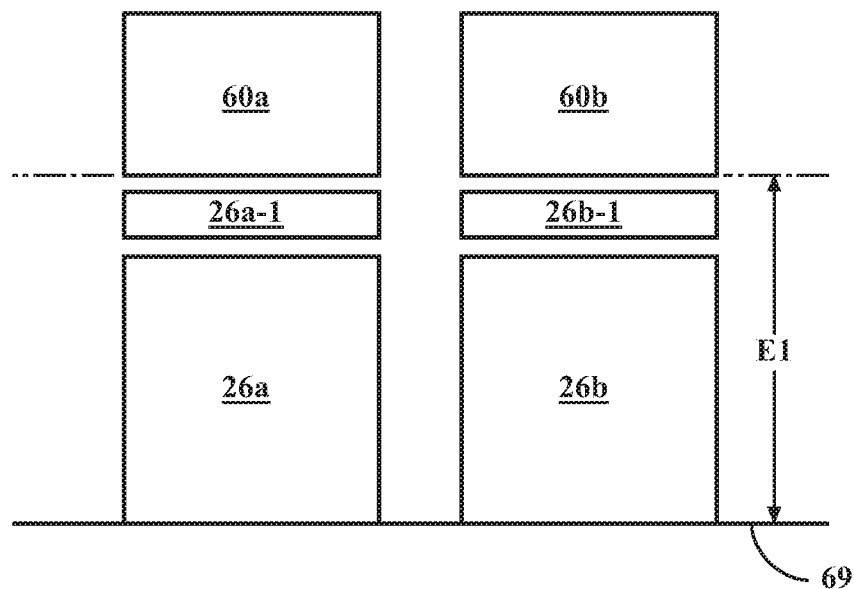
FIG. 3A is a schematic side view of a pair of tooling positioning devices supporting associated tools positioned at the same elevation with respect to a floor of a manufacturing facility.
Figure 3B:
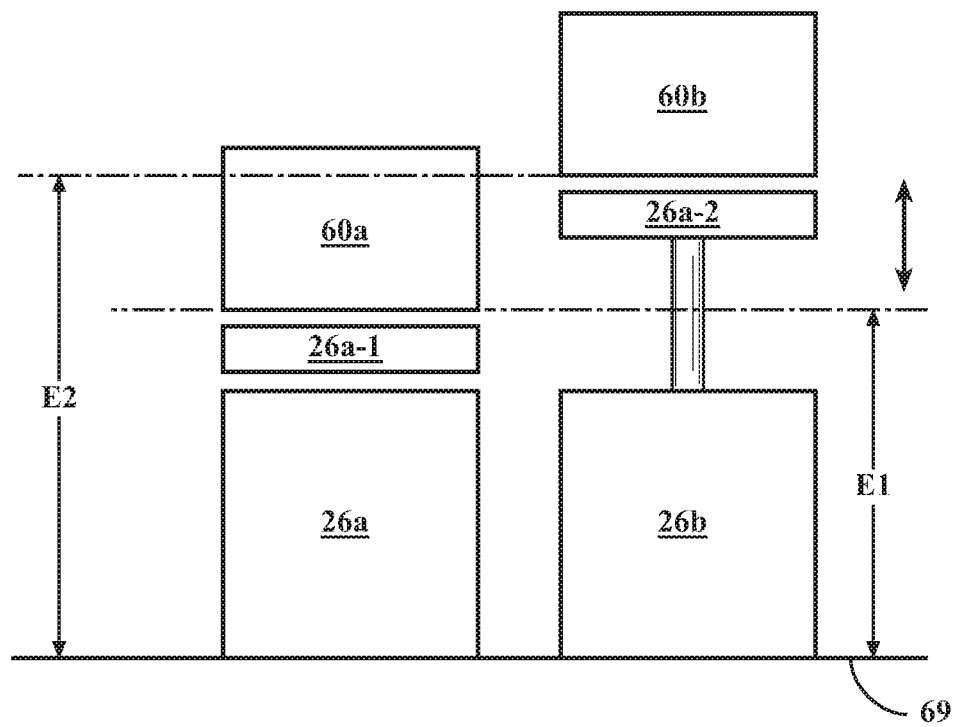
FIG. 3B is the view of FIG. 3A showing a changed elevation of one of the tools in FIG. 3A with respect to the other tool shown in FIG. 3A.

A tooling positioning device 26 is a device in the workspace on which an associated tool 60 is placed or mounted for use during performance of the manufacturing process. FIG. 1 shows three tooling positioning devices 26*a*, 26*b*, 26*c* schematically arranged in the workspace to support three associated tools 60*a*, 60*b*, 60*c* thereon. One or more parts bins 44 may be positioned adjacent the tooling positioning devices 26*a*, 26*b*, 26*c* as needed to facilitate workflow. Each tooling positioning device 26 may be, for example, a base, stand, or table on which the tool is placed for use in the process. In one or more arrangements, the tooling positioning device 26 may be an active device such as a motorized x-y positioning stage enabling lateral repositioning of a tool mounted on the stage. An active tooling positioning device may also be (or include) a vertically-movable platform as shown in FIGS. 3A and 3B enabling an elevation of the tool with respect to the floor to be adjusted. Moveable portions of the tooling positioning device may be configurable to be controllable by controller 22 to aid in positioning a tool placed on the tooling positioning device. Such active tooling positioning devices may be controlled by the controller/computer via wired or wireless connections, to vary the positions of tools mounted thereon. Examples of positioning devices which enable the elevation of a working surface to be varied include devices offered by LTW Ergonomic Solutions of Lawrence, Mich.

For example, referring to FIGS. 3A and 3B, in certain embodiments tooling positioning device 26a may have a vertically-movable platform 26a-1 enabling an elevation and depression of the tool 60a with respect to the floor 69 to be adjusted (i.e., enabling adjustment of the tool position along a z-axis). Also, tooling positioning device 26b may have a vertically-movable platform 26b-1 enabling an elevation and depression of the tool 60b with respect to the floor 69 to be adjusted. FIG. 3A shows the tool platforms 26a-1 and 26b-1 positioned at the same elevation E1 above the floor 69. In FIG. 3B, the platform 26b-1 has been controlled by controller 22 to raise the platform above elevation E1, to a higher elevation E2, thereby changing the position of tool 60b relative to tool 60a and providing a different tool spatial arrangement.

In one or more arrangements, any tooling positioning device 26 may include a mechanism configurable to be controllable to move the tooling positioning device to a desired location within the workspace (i.e., the tooling positioning device may be "self-propelled" and guidable by control signals from the controller 22). Thus, in such embodiments, the tooling positioning device 26 would not necessarily require the assistance of a tool transport device 24 to move the tooling positioning device 26 between different positions within the workspace 36.

Referring again to FIG. 1, the system 20 can include one or more sensors 38 (apart from RFID readers 28). "Sensor" means any device, component and/or system that can detect, and/or sense something. The one or more sensors 38 can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensors 38 include a plurality of sensors, the sensors can function independently from each other. Alternatively, two or more of the sensors can work in combination with each other. In such a case, the two or more sensors can form a sensor network. Any of the sensors 38 can be operably connected to the controller processor(s) 22b, the database 42, and/or other elements of the system 20 either by hardwired connections or through a workspace communications interface 72 configured to communicate with other elements of the system 20 through a suitably configured communications network 30. Any suitable type of sensor can be used for a given application. Various examples of different types of sensors will be described herein. However, it will be understood that the embodiments are not limited to the particular sensors described.

Workspace sensors 38 may include any sensors suitable for detecting and/or measuring parameters which may affect the outcome of the process. Non-limiting examples of sensors include cameras, proximity sensors, temperature sensors, ambient light level sensors, and other sensors. For example, one or more cameras may be configured to determine operator ergonomic information such as operator height, reach, a length dimension of the operator between the hip region and the top of the operators' head, left or right-handed preferences of the operator, etc. A timer (not shown) may be used to measure the time required to complete a process or a sub-process. Data from sensors 38 may be used in controlling the tool spatial arrangements during process setup as described herein. Data from sensors 38 may also be analyzed to find patterns and correlations which may enable new and existing processes to be improved.

Workspace 36 may include any types of inspection gauges, fixtures, or other inspection apparatus (collectively designated 40) needed to inspect parts after performance of a manufacturing process run. In one or more arrangements, inspection equipment 40 and/or elements of the inspection procedure may be automated, with the inspection equipment 40 configured to upload or transmit all inspection results to the controller 22 and/or database 42 for use in post-process analysis and/or controller decision making.

In a first control mode, all information relating to each process run (for both production runs and runs following tooling setup for a new process) and all information relating to the individual tools and parts bins (including current tooling spatial or position information, a history of setup runs including setup spatial positions and parameters used, etc.) may be stored in the central memory or database 42. Each tool and parts bin may be assigned a unique identifier, and any information relating to any individual tool or parts bin may be associated with the identifier and may be accessed from database 42 by reference to the identifier. This control mode may reduce the information storage burden on the individual RFID tags.

Some stored information may relate to the process or processes performed using a tool or parts bin during a particular setup or over a particular time period. One example of such information is processed parts inspection results, after processing of a part on an individual tool or after completion of an entire process involving multiple tools. This information may be used in a process evaluation process directed to determining if the process is to be considered "good" or "not good". Another example of stored process information is the relative positions or spatial locations of the tools and parts bins in the workspace during a given process run. Such spatial positioning may affect the process efficiency and also finished part quality, thereby affecting whether the process is to be considered "good" or "not good". Other stored information may relate to particular tools or parts bins, independent of any particular process run. Examples of such information may include the total number process cycles that have been performed on the tool, and the tool envelope.

In a second control mode, information relating to particular tools or parts bins may be stored in a RFID tag located on an associated tool, while the information relating to individual process runs may be stored in the database 42 as previously described.

The tooling spatial arrangement control module 22d can be implemented as computer-readable program code that, when executed by processor(s) 22b, function to perform operations on various tools and/or parts bins as described herein. The module 22d can be a component of the processor(s) 22b, or the module 22d can be executed on and/or distributed among other processing systems to which the processor(s) 22b is operably connected. The module 22d can include instructions (e.g., program logic) executable by the one or more processor(s) 22b. Alternatively, or in addition, one or more memories or data stores (not shown) may contain such instructions. The term "operably connected," as used throughout this description, can include direct or indirect connections, including connections without direct physical contact.

In one or more arrangements, the tooling spatial arrangement control module 22d described herein can include artificial or computational intelligence elements, e.g., neural network, fuzzy logic or other machine learning algorithms. Further, in one or more arrangements, the tooling spatial arrangement control module 22d can be distributed among a plurality of the modules, with each module performing one or more of the functions described herein.

The tooling spatial arrangement control module 22d may include instructions that when executed by the processor(s) 22b cause the processor(s) to receive a tool request from a user or another computing system. In one or more arrangements, a tooling request to the controller 22 may be automatically generated as part of a work order. A tooling request may be a request for one or more tools needed to perform a manufacturing process. For example, a user may enter the requested information and/or select one of the following non-exclusive options from a menu:

tooling information options:
  a request (using a unique tool identifier) for a particular tool(s);
  a request (using a manufacturing process code) for all tools needed to performing a particular manufacturing process;
  input of a Part/Sub-Assembly Number or other designation from which information describing the tooling required to process the part/sub-assembly may be extracted;
  a designated workspace where tooling is to be deposited/set up;
  a type of set up (new process setup or running of an established process); and
  a date and a time when the tools will be needed.

The tooling spatial arrangement control module 22d may include instructions that when executed by the processor(s) 22b cause the processor(s) to link a user menu selection to one or more locations in a database (such as database 42) storing process information and information on tools used for various manufacturing operations pertaining to the user menu selection.

The tooling spatial arrangement control module 22d may include instructions that when executed by the processor(s) 22b cause the processor(s) to identify which tools satisfy the tool request. The controller may query the database 42 for all tools needed for the manufacturing process or which otherwise satisfy the requirements of the tool request.

The tooling spatial arrangement control module 22d may include instructions that when executed by the processor(s) 22b cause the processor(s) to determine the availability of the tools which satisfy the tool request. Some tools which may satisfy the tooling request may be in use for other processes or undergoing maintenance. The controller 22 may query database records to determine the current location and availability of each tool which satisfies the tool request. As part of determining tool availability, the controller 22 may determine the locations of the tools to ensure that any tools which may be selected reside within the manufacturing facility or are otherwise accessible.

The tooling spatial arrangement control module 22d may include instructions that when executed by the processor(s) 22b cause the processor(s) to select (from the available tools which satisfy the tool request) particular tools to acquire for the manufacturing process. Selection of the particular tools may be based on various criteria, for example, number of process cycles performed since last maintenance, etc. The selection criteria may be user-defined or may be defined by the module 22d based on automated analysis of past process data relating to the tool. The controller 22 may be configured to analyze process data to search for correlations between the various characteristics of the tool (such as number of process cycles performed since last maintenance, for example) and process runs using the tools which have been deemed "good". For example, if the controller 22 finds a particularly high correlation between a "good" process run and a relatively low number of process cycles performed on the tool since last maintenance, the controller 22 may select the available tool with the lowest number of process cycles performed on the tool since last maintenance.

The tooling spatial arrangement control module 22d may include instructions that when executed by the processor(s) 22b cause the processor(s) to control operation of tooling transport devices 24 to acquire the selected tools for the manufacturing process.

The tooling spatial arrangement control module 22d may include instructions that when executed by the processor(s) 22b cause the processor(s) to control operation of tooling positioning devices 26 and/or tooling transport devices 24 to transport tools/bins between different portions of the manufacturing facility (including to a designated workspace), and to effect any other movement of the tools/bins which will position the tools/bins in a desired initial or first tool spatial arrangement within the designated workspace. A "tool spatial arrangement" is an arrangement in three-dimensional space of a single tool or parts bin within the volume of a workspace, or an arrangement in three-dimensional space of multiple tools and/or bins within the volume of a workspace. For example, a position of each tool and parts bin in a workspace may be described in terms of coordinates of a unique reference feature of the tool/bin within a three dimensional coordinate system (for example, an x-y-z coordinate system as shown in FIG. 2) defined for the workspace. Also, positions of multiple tools/bins with respect to each other within the workspace may be described in terms of differences between the x, y, and z-coordinates of the individual tools/bins. The reference feature of a tool/bin may be a feature having a position on the tool/bin which may be modified through repositioning by a tooling transport device and/or a tooling positioning device as described herein, thereby changing the position of the tool/bin within the workspace. The repositioning of the tool/bin may be done between operations using the tool/bin, so that one or more further operations may be conducted using the tool/bin while in its new position in the workspace.

Positioning of a tool or parts bin in a workspace refers to placing the tool or bin in a position in which it is to reside during performance of the manufacturing process for which it has been transported to the workspace. The positioning of the tool/bin may entail, for example, moving the tool/bin so that a reference feature of the tool/bin resides at a location it will occupy while the tool/bin is being used during the performance of the manufacturing operation. In another example, positioning of the tool/bin may entail moving the tool/bin so that the tool/bin reference feature resides at predetermined spatial location within the volume of the workspace, or in a predetermined spatial relationship to a reference feature of another tool/bin positioned within the workspace. Other criteria may also be used for positioning the tool/bin in within the volume of the workspace. For example, positioning of the tool/bin may be accomplished using a tooling transport device to position a tool/bin at a specified location on a floor of the workspace. Positioning of the tool/bin may also be accomplished using a tooling transport device to place a tool on a working surface (such as a table top) of a tooling positioning device.

Other elements such as parts bins, trays and/or other sources of components or workpieces (collectively referred to herein as "parts bins") may also have RFID tags attached thereto, so that the positions of these elements may be monitored and logged. The elements may also be repositioned within a workspace using a tooling transport device and/or a tooling positioning device as described herein.

Figure 4A:
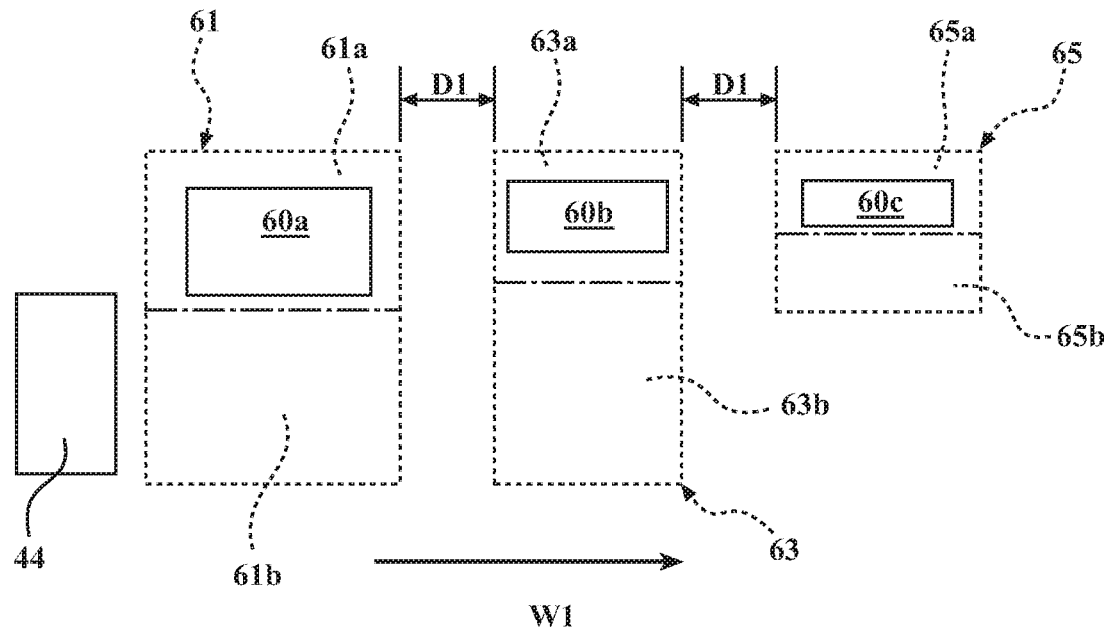
FIG. 4A is a block schematic plan view of a tool spatial arrangement in accordance with one embodiment described herein.

The first tool spatial arrangement may be selected by the controller based on the configurations of the envelopes of the tools, the shape and dimensions of the workspace, and other pertinent factors. For example, the controller 22 may be configured to, if a length dimension of a designated workspace exceeds a width dimension extending orthogonal to the length dimension by a predetermined amount, position the tools in a first tool spatial arrangement as shown in FIG. 4A. The spatial arrangement shown in FIG. 4A may space apart the tool envelopes of the tools equidistantly (by a distance D1) to aid in preventing crowding of the tools in the workspace. In one or more arrangements, a default first tool spatial arrangement may be provided which the controller 22 will use as a baseline, provided the default first tool spatial arrangement fits inside the designated workspace.

The tooling spatial arrangement control module 22d may include instructions that when executed by the processor(s) 22b cause the processor(s) to transmit to controller 22 and/or database 42 (via wired and/or wireless communications network 30) data and values of pertinent parameters prior to a process run, after the tools have been positioned for a process run and before the process run commences. Such parameters may include the relative spatial positions of the tools, operator ID, and any of a variety of other information that may be recorded on the RFID and read by an RFID reader. The information may also include data from sensors 38 positioned in the workspace 36 and any other data or information which may affect performance of the process and/or which may be used to establish a baseline for measurement of process-related parameters. In a process involving multiple tools which are to be used sequentially by the operator, the process may be divided into a sub-process for each individual tool, and process data for the operation performed on each tool may be gathered.

The tooling spatial arrangement control module 22d may include instructions that when executed by the processor(s) 22b cause the processor(s) to receive and process information from the RFID tag readers 28. The controller 22 may be configured to receive (via communications network 30) updated RFID tag information from any of the tag readers 28 located in the manufacturing facility. For each of the first and second control modes described above, RFID tag readers 28 may read the tags attached to tools/bins positioned in the workspace 36 after the tools/bins have been positioned for a process run. Each reader 28 may be configured to detect the distance of a detected tag from the reader. Using these detected distances and the known locations of the readers 28 within the workspace and manufacturing facility, spatial coordinates and/or relative spatial positions of the tags (and the associated reference features of the tools) may be determined in a known manner, for example, by triangulation. This tool/bin position information may be transmitted to the controller 22 and stored in database 42.

During a process run using a selected first tool spatial arrangement, process data and/or tool data as described herein may be gathered by the RFID tag readers 28, by sensors 38 in workspace 36 configured to detect various process and operator parameters, and/or by any other suitable means. The information gathered during the process run may be transmitted to the controller 22 and stored in database 42. The process data for each run may be stored in database 42 for analysis by controller 22 in determining positional modifications to be made to the tools/bins prior to the next process run.

The tooling spatial arrangement control module 22d may include instructions that when executed by the processor(s) 22b cause the processor(s) to, following a process run using the tools in the first tool spatial arrangement, perform an evaluation of the process run made using the tools in the first tool spatial arrangement. A process run may be the performance of a process using a single tool (i.e., a sub-process for a larger process using multiple tools in sequence) or the process run may be the performance of a process involving the sequential use of multiple tools in the workspace. For example, the tooling spatial arrangement control module 22d may include instructions that when executed by the processor(s) 22b cause the processor(s) to, as part of a process evaluation, process the information received from a workspace to determine if the process run is "good" or "not good". If the process run is "good", the set of stored parameter values for the process run may be flagged as "successful". If the process run is "not good" (for example, if the percentage of scrap generated by the process run is above a predetermined threshold), the set of parameter values related to the process run may be flagged as "unsuccessful". Any suitable criteria may be used to determine whether a process run is "good" or "not good". In one example, the determination may be made by measuring one or more critical dimensions affected by the tool after a component or sub-assembly has been operated on using the tool. The determination of "good" or "not good" may be automated based on automated inspection criteria (for example, one or more critical dimensions of at least a predetermined percentage of the parts processed falling outside associated tolerance ranges). Information received from the workspace 36 may be received and (if needed) processed by processors(s) 22b. The processed information and/or any pertinent unprocessed information received from the workspace may be compared with various criteria to determine whether a process run is "good" or "not good". Alternatively, the process evaluation may be performed by another computing system or a user, and the results of the evaluation may be sent to the controller 22 for action responsive to the results of the evaluation.

Figure 5:
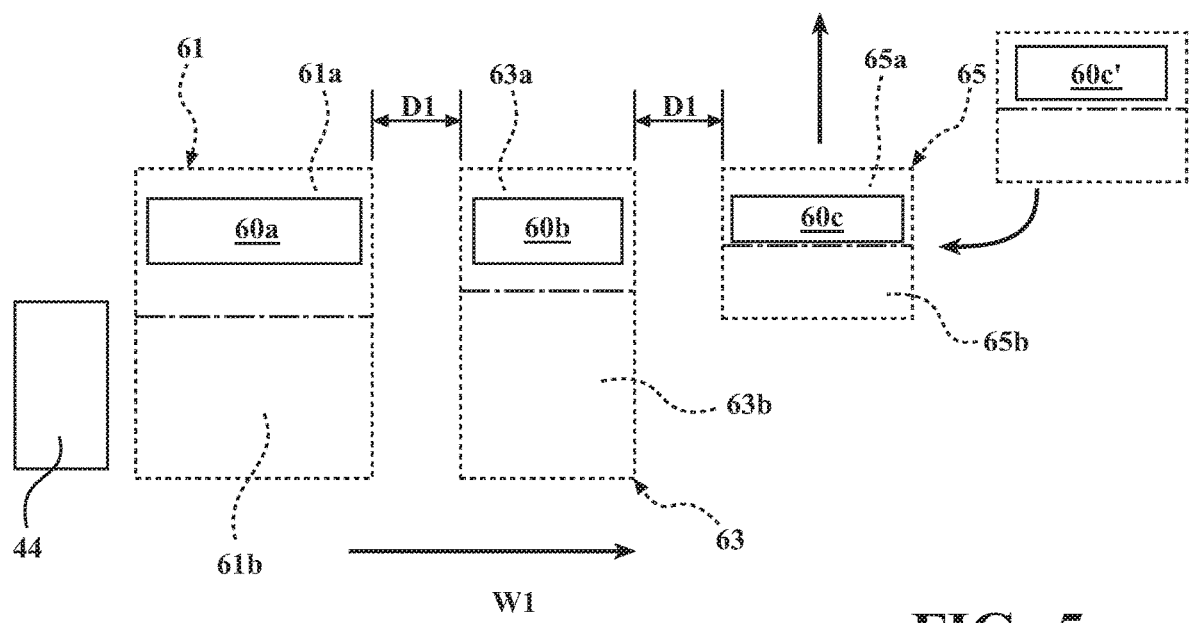
FIG. 5 is a schematic plan view showing an example of replacement of a tool in a workspace with a similar tool.

The tooling spatial arrangement control module 22d may include instructions that when executed by the processor(s) 22b cause the processor(s) to, responsive to a result of the process evaluation of the first performance of the process which indicates that the process run was "not good", control operation of the tooling transport devices 24 and/or the tooling positioning devices 26 so as to replace a tool in the first tool spatial arrangement with another tool configured to perform a function of the tool to be replaced. The replacement tool may occupy the same spatial position as the tool that is replaced. For example, FIG. 5 illustrates an example of replacement of a tool 60c in a workspace with a similar tool 60c'. A determination that the process run was "not good" may indicate a possible problem with one or more of the tools. For example, if the scrap count produced during the process run exceeds a predetermined threshold, the controller 22 may initiate replacement of a tool. If the sub-process results following operations on each individual tool are being monitored, the results for each tool may be examined to determine which (if any) of the tools appears to be producing a relatively higher scrap count. This information can be used to determine which tool or tools to replace.

After one or more tools have been replaced in the in the first tool spatial arrangement with other tool(s), another process run may be performed with the tools in the first tool spatial arrangement and the process results sored and analyzed as previously described. The stored process data from setup operations may be analyzed by users and/or statistical or other analysis programs to detect patterns in the data and any correlations between the tooling information, tool/bin spatial arrangements, and process results (i.e., "good" or "not good"). Analysis of this information may be useful in setting up future processes and in troubleshooting problems with existing, established processes.

If the process run is determined to be "good", the tool or tools used to process the component or sub-assembly may be deemed capable of producing satisfactory parts. The tooling spatial arrangement control module 22d may include instructions that when executed by the processor(s) 22b cause the processor(s) to, if the process run is determined to be "good", reposition one or more of the tools 60 in the workspace 36 to provide a second tool spatial arrangement for another process run, to provide a basis for comparison with the process run using the first tool spatial arrangement. In addition, the process parameters, tool spatial arrangements, and other recorded parameters of the "good" process run in the first tool spatial arrangement may be stored in a database file for further analysis. This database file may contain an indication that the process run having the parameters and data saved in the file was considered to be "good", and may be analyzed to provide information related to a "good" process. Information gathered from multiple process runs may be used in an attempt to improve or optimize the process. For example, differences in one or more dimensions of a tool spatial arrangement may affect a process run so as to increase the part handling time required by an operator, or so as to reduce operator fatigue.

Figure 4B:
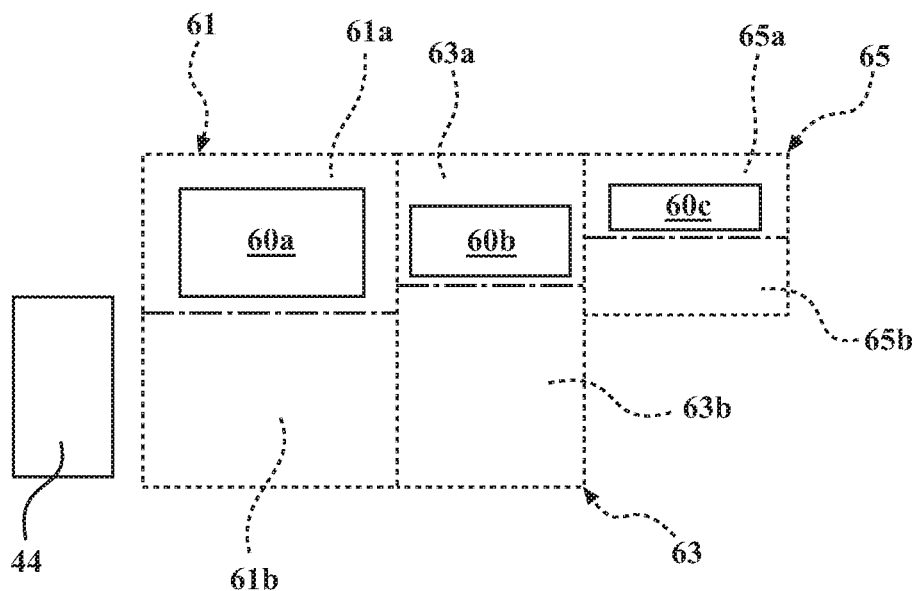
FIG. 4B is a block schematic plan view of a tool spatial arrangement in accordance with another embodiment described herein.

In one example of autonomous tool repositioning, the tooling spatial arrangement control module 22d may include instructions that when executed by the processor(s) 22b cause the processor(s) to reposition one or more of tools 60 into a second tool spatial arrangement by increasing or reducing the spacing between one or more pairs of tool envelopes of the tools. For example, the tooling spatial arrangement control module 22d may control operation of the tooling transport devices 24 and/or the tooling positioning devices 26 so as to reduce the distances D1 between the tool envelopes 61, 63, 65 in FIG. 4A until the envelopes are contiguous (i.e., touching each other) as shown in FIG. 4B. This may provide a more compact tool spatial arrangement which may reduce time required by the operator in moving between tools 60 during the manufacturing process. Depending on the configuration of the workspace 36, the module 22d may also control operation of the tooling transport devices 24 and/or the tooling positioning devices 26 so as to position the tools 60 in the arrangement shown in FIG. 4B as a first tool spatial arrangement.

Figure 4C:
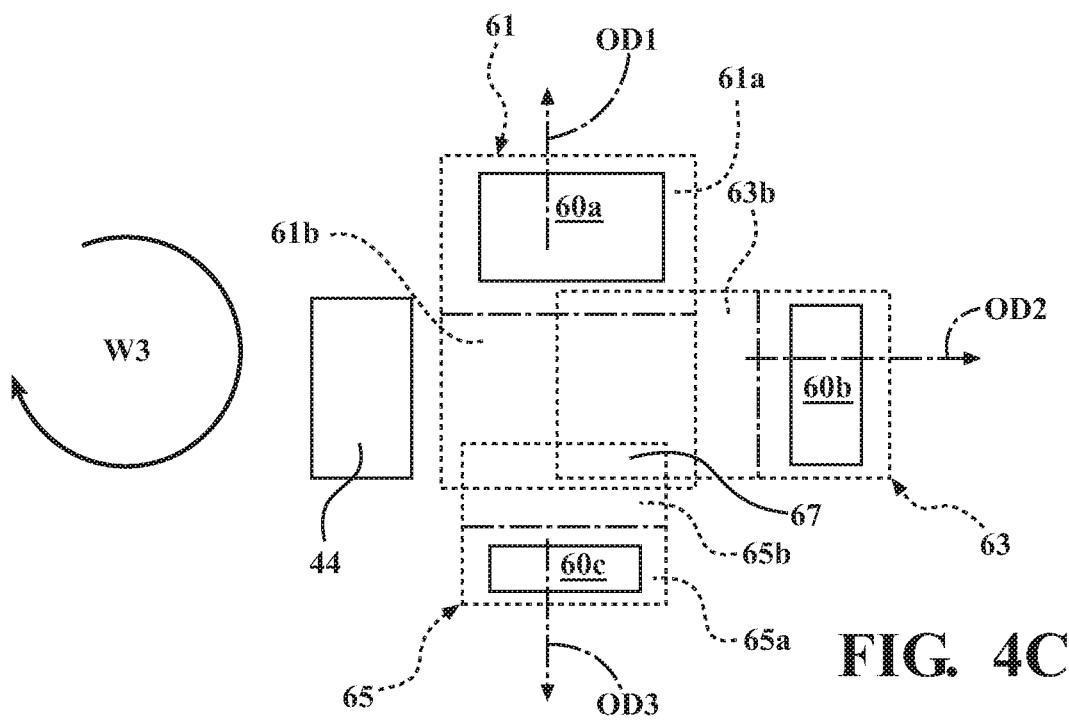
FIG. 4C is a block schematic plan view of a tool spatial arrangement in accordance with yet another embodiment described herein.

Referring to FIG. 4C, in another example, the tooling spatial arrangement control module 22d may include instructions that when executed by the processor(s) 22b cause the processor(s) to position the tools 60 in the workspace 36 so that at least a portion of the operator space of each tool overlaps at least a portion of the operator space of each of the other tools. For example, as shown in FIG. 4C, the operator spaces 61b, 63b, and 65b may have some degree of overlap 67. This may result in the tools being arranged in a more compact pattern (such as the circular pattern shown), in which the workflow proceeds in the direction W3 from tool 60a to tool 60b, then to tool 60c. Depending on the configuration of the workspace 36, the module 22d may also control operation of the tooling transport devices 24 and/or the tooling positioning devices 26 so as to position the tools 60 in the arrangement shown in FIG. 4C as a first tool spatial arrangement.

The tools 60a, 60b, 60c may be oriented so that an operator faces a particular direction during use of the tool for a manufacturing process or a portion of a process. For example, in the spatial arrangement shown in FIG. 4C, tool 60a is oriented so that an operator will face in direction OD1 during use of the tool for a manufacturing process or a portion of a process. In addition, the tools may be oriented as shown in FIG. 4C so that the directions OD1, OD2, and OD3 extend orthogonally or substantially orthogonally to each other (i.e., the tool facing directions OD1, OD2, OD3 may be spaced angularly apart at or about 90°). The controller 22 may be configured to reposition one or more of the tools 60a, 60b, 60c so as to incrementally vary one or more of the angular spacings for successive test or trial process runs. For example, the tools 60a, 60b, 60c may initially be spaced apart 90°, and then one or more tools may be repositioned to change the angular spacing to a value less than 90°, to attempt to fit a usable arrangement of the tools into as small a volume of space as possible. To this end, the controller may also incrementally vary the position(s) of one or more tools to attempt to maximize the area of overlap 67, to aid in reducing a distance an operator must travel between tools during performance of the process. Also, although the tools 60a, 60b, 60c shown in FIG. 4C are arranged so that their operator facing directions OD1, OD2, OD3 are orthogonal, the controller may be configured to arrange any tools in a workspace so that their respective operator facing directions are angularly spaced apart by any desired amount(s), for example 45° or 60°.

In general, controller 22 may include instructions that when executed by the processor(s) 22b cause the processor(s) to vary incrementally particular dimensions, spacings, and other parameters of tool spatial arrangements so as to enable the effects (if any) of such variations on a manufacturing process to be determined from analysis of process data in conjunction with the tool spatial arrangement parameters. For example, the height above the floor of a single tool in an arrangement of multiple tools may be varied, and a process run may be executed using the revised height. In other examples, a single linear or angular spacing between two tools in an arrangement of tools may be changed, followed by process runs using the tools in the revised arrangement. Data may be collected after each process run following a change in tool spatial arrangement, to enable analysis of possible effects of the changes in tool spatial arrangements on the manufacturing process. The ability of the controller to automatically control individual aspects or dimensions of the tool spatial arrangements between test process runs may provide a wealth of data for determining the effects of spatial arrangements on a given process. The controller 22 may be configured to implement internal decision-making processes (through artificial or computational intelligence elements, for example, and as illustrated in examples provided herein) to control tool spatial arrangements. The controller may also be configured to receive and implement user input to control tool spatial arrangements.

Figure 4D:
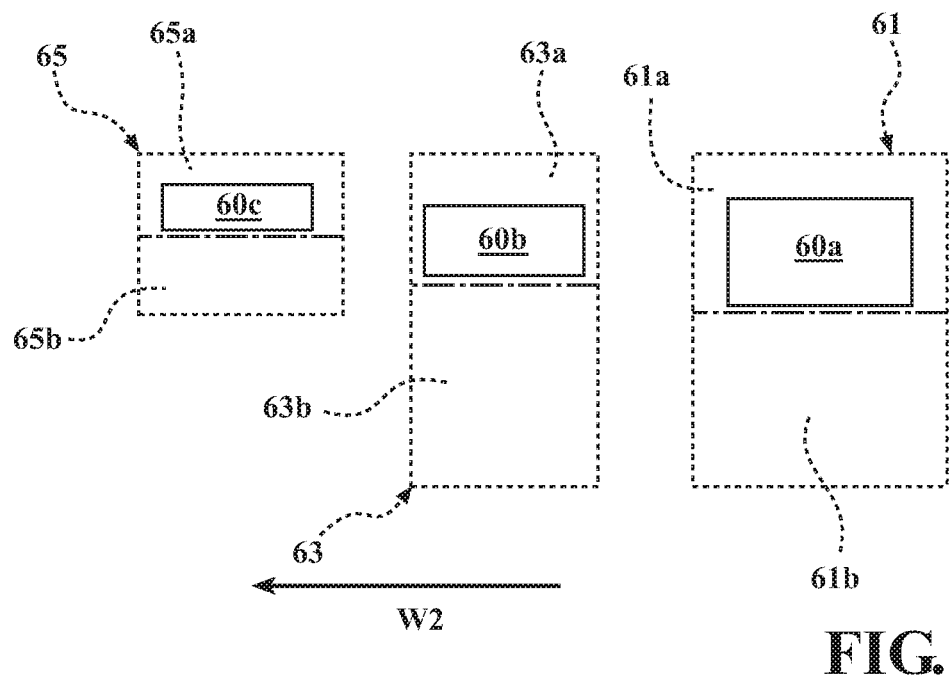
FIG. 4D is a block schematic plan view of a tool spatial arrangement in accordance with yet another embodiment described herein.

In one or more arrangements, tool position within the workspace 36 may be revised based on ergonomic considerations. In one example, referring to FIGS. 4A and 4D, the tooling spatial arrangement control module 22d may include instructions that when executed by the processor(s) 22b cause the processor(s) to determine one of a right-handed and a left-handed preference of an operator performing the process, and to reposition one or more tools 60 in the workspace 36 responsive to the determined preference. For example, a tooling spatial arrangement may initially be as shown in FIG. 4A (with the process flow moving from left to right in direction W1, from tool 60a toward tool 60c). During a process run, the controller 22 may determine, as a result of the operator's movements during the process run, that the operator has a left-handed preference. The controller may then autonomously reposition the tools 60 as shown in FIG. 4D so that the work flows between tools in a leftward direction W2 from the operator's perspective. This may be more comfortable for the operator and may reduce cycle time.

Referring again to FIGS. 3A and 3B, in another example, the tooling spatial arrangement control module 22d may include instructions that when executed by the processor(s) 22b cause the processor(s) to autonomously control operation of the tooling transport devices 24 and/or the tooling positioning devices 26 so as to reposition one or more tools in the workspace by changing an elevation(s) of the one or more tools in the workspace. For example, FIG. 3A shows both of tools 60a, 60b at a first elevation E1 with respect to a floor 69 on which their respective tool positioning devices 26a, 26b rest. FIG. 3B shows an elevation of tool 60b increased to an elevation E2 greater than E1. This type of repositioning may be done, for example, responsive to a measurement by workspace sensors 38 of a height of the operator, a determination that the height of the operator is above or below an average height of operators (or above or below some predetermined value), and a determination that a change is elevation of one or the tools may be ergonomically desirable. Thus, the tooling spatial arrangement control module 22d may include instructions that when executed by the processor(s) 22b cause the processor(s) to determine a height of an operator performing the process, and to reposition the one or more tools 60 in the workspace 36 to provide the second tool spatial arrangement responsive to the height of the operator.

Other revisions to tooling spatial arrangements are also possible. Process results and the values of various parameters relating to the various tooling spatial arrangements and stored in database 42 may be analyzed later to aid in improving the process and to help discern spatial arrangements and/or relationships between tools which affect performance of the process.

The tooling spatial arrangement control module 22d may include instructions that when executed by the processor(s) 22b cause the processor(s) to, following a process run using the tools 60 as arranged in the second tool spatial arrangement, perform an evaluation of the process run using the tools as arranged in the second tool spatial arrangement. Then, responsive to a first result (for example, a determination that the process run was "not good") of the evaluation of the process run using the tools as arranged in the second tool spatial arrangement, the controller 22 may control operation of the tooling transport devices 24 and/or the tooling positioning devices 26 so as to replace a tool in the second tool spatial arrangement with another tool configured to perform a function of the tool to be replaced. The tool to be replaced may be replaced in the same manner as previously described. After tool replacement, another process run may be performed.

The tooling spatial arrangement control module 22d may also include instructions that when executed by the processor(s) 22b cause the processor(s) to, responsive to a second result (for example, a determination that the process run was "good") different from the first result of the evaluation of the process run using the tools as arranged in the second tool spatial arrangement, control operation of the tooling transport devices 24 and/or the tooling positioning devices 26 so as to reposition one or more of tools 60 in the workspace to provide a third tool spatial arrangement within the workspace 36 different from the first and second tool spatial arrangements. The tool(s) to be repositioned may be repositioned into an arrangement as previously described, or into another arrangement. After repositioning, another process run may be performed during which additional data may be gathered for analysis.

In another operational mode, the tooling spatial arrangement control module 22d may also include instructions that when executed by the processor(s) 22b cause the processor(s) to receive instructions from a user regarding how to reposition one or more of the tools 60 in the workspace 36. For example, using the input system 46 of the user interface 50, a user may select a particular tool in the workspace 36 and specify an amount by which the tool is to be elevated or an amount by which one or more of the x, y, and/or z spacings between the tools in the workspace 36 are to be adjusted for the next process run.

Figure 6:
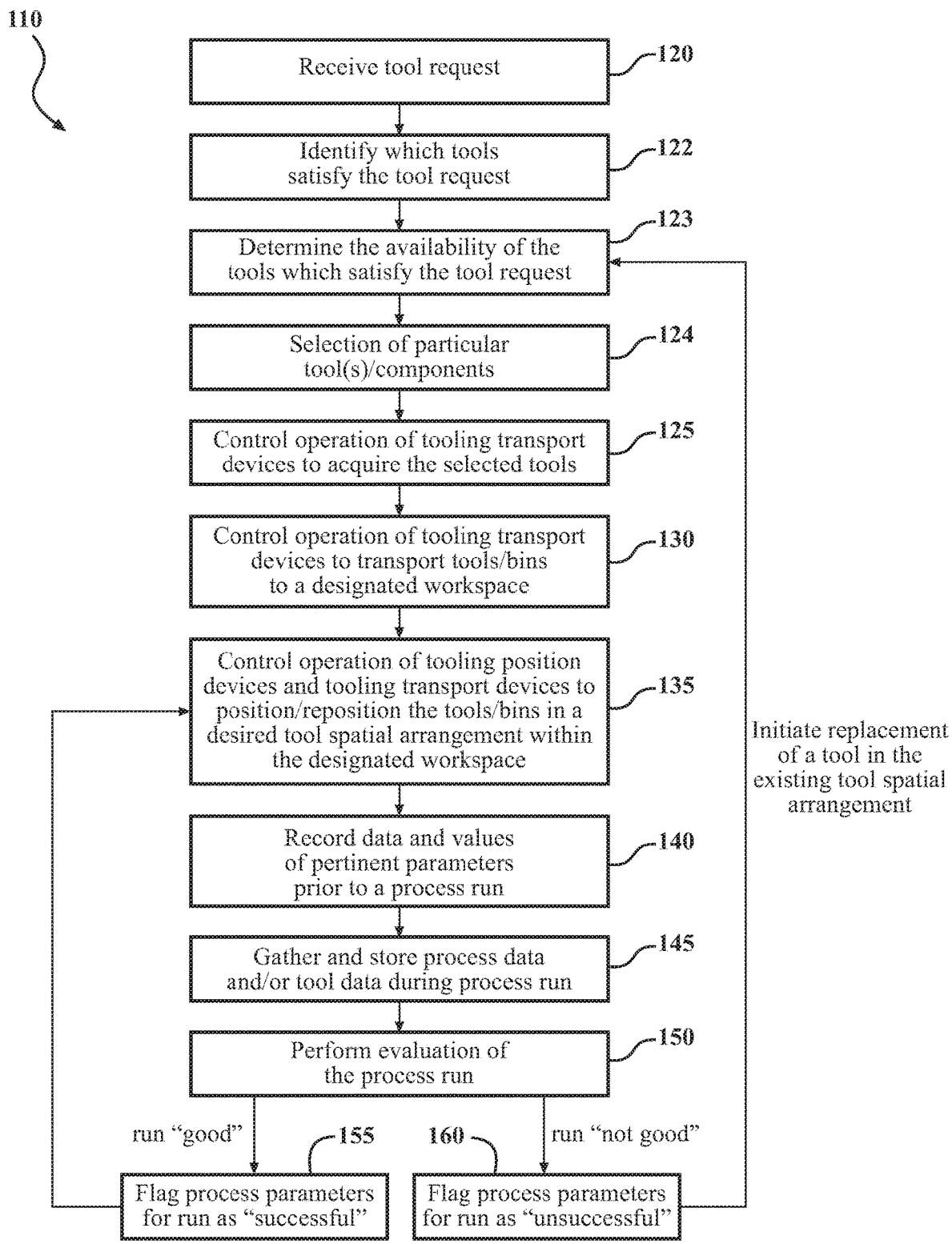
FIG. 6 is a flow diagram showing one example of an automated method for selecting one or more tools for an operation, acquiring and moving the selected tools to a designated workspace, positioning the tools in the workspace, and replacing or adjusting the positions of the tools as needed.

FIG. 6 shows one example of an automated method 110 for selecting one or more tools for an operation, acquiring and moving the selected tools to a designated workspace, positioning the tools in the workspace, and replacing or adjusting the positions of the tools as needed. The method may be usable for new manufacturing process setup or performance of an existing process.

In block 120, the controller may receive a tool request for a tool or a set of tools needed to perform a manufacturing process. In block 122, the controller may identify which tools satisfy the user request. In block 123, the controller may determine the availability of the tools which satisfy the user request. In block 124, the controller may select particular tools from the available tools based on various selection criteria, such as the number of process cycles since last maintenance, etc., as previously described. In block 125, the controller may control operation of the tool transport devices to acquire the selected tools. In block 130, the controller may control the tool transport devices to transport the tools to the designated workspace.

In block 135, the controller may control the tool transport devices and/or the tool positioning devices to position the tools in a first tool spatial arrangement within the workspace. The first tool spatial arrangement may be selected by the controller based on the space envelopes of the tools, the shape and dimensions of the workspace, etc. as previously described. In block 140, pertinent process, positional, and other parameters may be acquired and stored in database 42 prior to a process run. Such parameters may include the relative spatial positions of the tools, operator ID, and any of a variety of other information that may be determined using sensors, is recorded on the RFID and/or from other sources. In block 145, the process may be run and process run data may be collected. In block 150, the finished parts may be inspected and the process data may be analyzed to determine if the process run was "good" or "not good". The process run may be manually flagged as "good" or "not good" after parts inspection, or the process run may be automatically flagged as "good" or "not good" responsive to part results of part inspection, either by an operator or an automated system, for example.

If the process run was "good", the controller may (in block 155) flag the set of parameter values for the process just run as "successful". Control may then return to block 135 to reposition one or more tools into a different (i.e., second, third, fourth, etc.) spatial arrangement based on certain criteria as previously described in an attempt to improve or optimize the process. If the process is "not good" (e.g., scrap % too high), the controller 22 may (in block 160) flag the set of parameter values for the process just run as "unsuccessful". In addition, if the process is "not good", control may then transfer to block 123, where the controller 22 may control operation of the tooling transport devices 24 and/or the tooling positioning devices 26 so as to replace a tool in the first tool spatial arrangement with another tool configured to perform a function of the tool to be replaced. After the tool is replaced, another process run may be initiated as previously described.

All pertinent data for each process run is recorded in a memory/database. The various types of data may be analyzed for correlations, etc. as previously described.

Various criteria may be used to determine when to discontinue the automated setup assist process. For example, the process 110 may proceed as previously described until discontinued by a user (for example a command entered via user interface 50), until trial manufacturing process runs have been made using a predetermined number of tool spatial arrangements, or until the number of available replacement tools has been exhausted in running the setup processes. Other process termination criteria may also be used.

For running an existing process instead of setting up a new process, the same method may be used with the automatic repositioning disabled.

In another aspect, embodiments described herein relate to a method of determining a spatial arrangement for tools in a workspace for performance of a manufacturing process. The method may include a step of controlling operation of one or more tooling transport devices and/or one or more tooling positioning devices so as to position one or more tools to provide a first tool spatial arrangement within a workspace. The method may also include a step of, following a performance of a process run using the tools in the first tool spatial arrangement, performing an evaluation of the process run using the tools in the first tool spatial arrangement. The method may include a step of, responsive to a first result of the evaluation of the process run using the tools in the first tool spatial arrangement, controlling operation of the one or more tooling transport devices and/or the one or more tooling positioning devices so as to replace a tool in the first tool spatial arrangement with another tool configured to perform a function of the tool to be replaced. The method may include a step of, responsive to a second result different from the first result of the evaluation of the process run using the tools in the first tool spatial arrangement, controlling operation of the one or more tooling transport devices and/or the one or more tooling positioning devices so as to reposition one or more tools in the workspace to provide a second tool spatial arrangement within the workspace different from the first tool spatial arrangement.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11B, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An automated manufacturing process tooling setup assist system comprising:
    one or more processors;
    a memory communicably coupled to the one or more processors and storing a tooling spatial arrangement control module including instructions that when executed by the one or more processors cause the one or more processors to:
    control operation of one or more tooling transport devices and/or one or more tooling positioning devices so as to position one or more tools to provide a first tool spatial arrangement within a workspace;
    responsive to a first result of an evaluation of a process run using the one or more tools in the first tool spatial arrangement, control operation of the one or more tooling transport devices and/or the one or more tooling positioning devices so as to replace a tool in the first tool spatial arrangement with another tool configured to perform a function of the tool to be replaced; and
    responsive to a second result different from the first result of the evaluation of the process run using the one or more tools in the first tool spatial arrangement, control operation of the one or more tooling transport devices and/or the one or more tooling positioning devices so as to reposition one or more tools of the one or more tools in the workspace to provide a second tool spatial arrangement within the workspace different from the first tool spatial arrangement.

2. The system of claim 1 wherein each tool of the one or more tools has a tool envelope associated therewith, and wherein the tooling spatial arrangement control module includes instructions that when executed by the one or more processors cause the one or more processors to position the one or more tools in the workspace such that tool envelopes of tools of pairs of adjacent tools of the one or more tools are spaced apart equidistantly.

3. The system of claim 1 wherein each tool of the one or more tools has a tool envelope associated therewith, and wherein the tooling spatial arrangement control module includes instructions that when executed by the one or more processors cause the one or more processors to position the one or more tools in the workspace so that the tool envelopes of adjacent tools of the one or more tools are contiguous.

4. The system of claim 1 wherein each tool of the one or more tools has an operator space associated therewith, and wherein the tooling spatial arrangement control module includes instructions that when executed by the one or more processors cause the one or more processors to position the one or more tools in the workspace so that at least a portion of the operator space of each tool of the one or more tools overlaps at least a portion of the operator space of each of the other tools of the one or more tools.

5. The system of claim 1 wherein the tooling spatial arrangement control module includes instructions that when executed by the one or more processors cause the one or more processors to control operation of the one or more tooling transport devices and/or the one or more tooling positioning devices so as to reposition one or more tools of the one or more tools in the workspace by changing an elevation of the one or more tools in the workspace.

6. The system of claim 1 wherein the tooling spatial arrangement control module includes instructions that when executed by the one or more processors cause the one or more processors to:
    determine a height of an operator performing the process; and
    reposition one or more tools of the one or more tools in the workspace to provide the second tool spatial arrangement responsive to the height of the operator.

7. The system of claim 1 wherein the tooling spatial arrangement control module includes instructions that when executed by the one or more processors cause the one or more processors to:
    responsive to a first result of an evaluation of a process run using the one or more tools as arranged in the second tool spatial arrangement, control operation of the one or more tooling transport devices and/or the one or more tooling positioning devices so as to replace a tool in the second tool spatial arrangement with a tool configured to perform a function of the tool to be replaced; and
    responsive to a second result different from the first result of the evaluation of the process run using the one or more tools as arranged in the second tool spatial arrangement, control operation of the one or more tooling transport devices and/or the one or more tooling positioning devices so as to reposition one or more tools in the workspace to provide a third tool spatial arrangement within the workspace different from the first and second tool spatial arrangements.

8. The system of claim 1 wherein the tooling spatial arrangement control module includes instructions that when executed by the one or more processors cause the one or more processors to:
    determine one of a right-handed and a left-handed preference of an operator performing the process; and
    reposition one or more tools of the one or more tools in the workspace responsive to the determined preference.

9. The system of claim 1 wherein the tooling spatial arrangement control module includes instructions that when executed by the one or more processors cause the one or more processors to control operation of the one or more tooling transport devices so as to:
- acquire one or more tools selected for use in performing the process in the workspace; and
- transport the selected one or more tools to the workspace.

10. The system of claim 1 wherein the tooling spatial arrangement control module includes instructions that when executed by the one or more processors cause the one or more processors to:
- receive and process tooling spatial arrangement information and manufacturing process information from the workspace; and
- following a performance of a process run using the one or more tools in the first tool spatial arrangement, perform the evaluation of the process run using the one or more tools in the first tool spatial arrangement.

11. A method of determining a spatial arrangement for tools in a workspace for performance of a manufacturing process, the method comprising steps of:
- controlling operation of one or more tooling transport devices and/or one or more tooling positioning devices so as to position one or more tools to provide a first tool spatial arrangement within the workspace;
- responsive to a first result of an evaluation of a manufacturing process run using the one or more tools in the first tool spatial arrangement, controlling operation of the one or more tooling transport devices and/or the one or more tooling positioning devices so as to replace a tool in the first tool spatial arrangement with another tool configured to perform a function of the tool to be replaced; and
- responsive to a second result different from the first result of the evaluation of the process run using the one or more tools in the first tool spatial arrangement, controlling operation of the one or more tooling transport devices and/or the one or more tooling positioning devices so as to reposition one or more tools in the workspace to provide a second tool spatial arrangement within the workspace different from the first tool spatial arrangement.

12. The method of claim 11 further comprising a step of positioning the one or more tools in the workspace such that tool envelopes of tools of pairs of adjacent tools of the one or more tools are spaced apart equidistantly.

13. The method of claim 11 wherein each tool of the one or more tools has a tool envelope associated therewith, and wherein the method further comprises a step of positioning the one or more tools in the workspace so that the tool envelopes of adjacent tools the one or more tools are contiguous.

14. The method of claim 11 wherein each tool of the one or more tools has an operator space associated therewith, and wherein the method further comprises a step of positioning the one or more tools in the workspace so that at least a portion of the operator space of each tool of the one or more tools overlaps at least a portion of the operator space of each of the other tools of the one or more tools.

15. The method of claim 11 further comprising a step of controlling operation of the one or more tooling transport devices and/or the one or more tooling positioning devices so as to reposition one or more tools in the workspace by changing an elevation of the one or more tools in the workspace.

16. The method of claim 11 further comprising steps of:
- determining a height of an operator performing the process; and
- repositioning the one or more tools in the workspace to provide the second tool spatial arrangement responsive to the height of the operator.

17. The method of claim 11 further comprising steps of:
- responsive to a first result of an evaluation of a manufacturing process run using the one or more tools as arranged in the second tool spatial arrangement, controlling operation of the one or more tooling transport devices and/or the one or more tooling positioning devices so as to replace a tool in the second tool spatial arrangement with a tool configured to perform a function of the tool to be replaced; and
- responsive to a second result different from the first result of the evaluation of the process run using the one or more tools as arranged in the second tool spatial arrangement, controlling operation of the one or more tooling transport devices and/or the one or more tooling positioning devices so as to reposition one or more tools in the workspace to provide a third tool spatial arrangement within the workspace different from the first and second tool spatial arrangements.

18. The method of claim 11 further comprising steps of:
- determining one of a right-handed and a left-handed preference of an operator performing the process; and
- repositioning the one or more tools in the workspace responsive to the determined preference.

19. The method of claim 11 further comprising steps of:
- acquiring one or more tools selected for use in performing the manufacturing process in the workspace; and
- transporting the selected one or more tools to the workspace.

* * * * *